Jan. 6, 1970   J. P. O'BRIEN   3,487,514
CUTTING TOOL
Original Filed Nov. 2, 1964
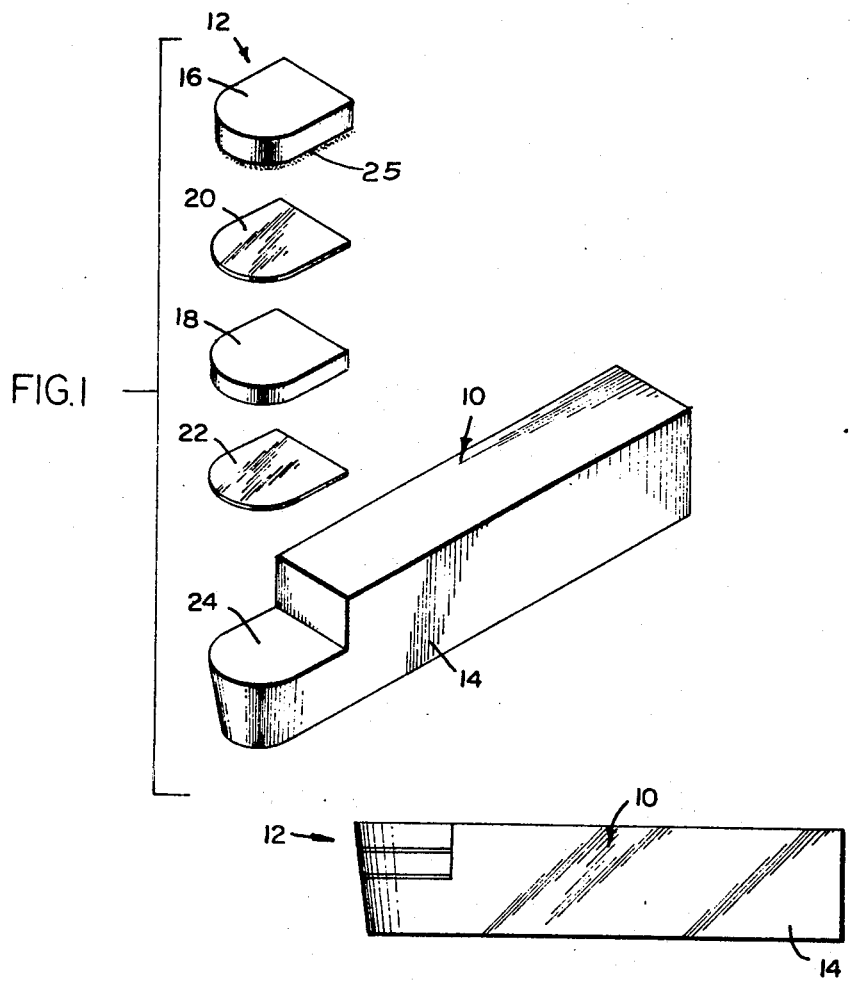
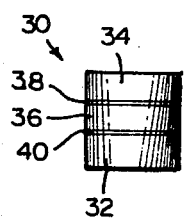
INVENTOR
John P. O'Brien
BY, Robert R. Churchill
ATTORNEY United States Patent Office 3,487,514
Patented Jan. 6, 1970

3,487,514
CUTTING TOOL
John P. O'Brien, 188 1st Parish Road,
Scituate, Mass. 02066
Continuation of application Ser. No. 408,071, Nov. 2, 1964. This application Feb. 28, 1968, Ser. No. 709,145
Int. Cl. B23p 15/28; B26d 1/00
U.S. Cl. 29—95
4 Claims

ABSTRACT OF THE DISCLOSURE

This invention relates to a cutting insert assembly of a metalized ceramic tip secured to a support layer of molybdenum by a preformed brazing shim and all secured to a base member by another preformed brazing shim.

---

This application is a continuation of my earlier filed application Ser. No. 408,071 filed Nov. 2, 1964 and now abandoned.

This invention relates to a cutting tool.

The invention has for an object to provide a novel and improved cutting tool comprising a cutting element adapted to be secured to a holder in a manner such as to absorb inherent stresses caused by expansion and contraction during a brazing operation of elements having widely varying coefficients of expansion whereby to provide a superior tool capable of withstanding severe stresses encountered in machining operations.

With this general object in view and such others as may hereinafter appear, the invention consists in the cutting tool as hereinafter described and particularly defined in the claims at the end of this specification.

In the drawings illustrating the preferred embodiment of the invention:

FIG. 1 is an exploded perspective view of a cutting tip assembly embodying the present invention and shown as bonded to a metal tool holder;

FIG. 2 is a side elevation of the present cutting tool; and

FIG. 3 is a side elevation of a modified form of the invention comprising a cutting tip assembly bonded to a metal element adapted to be torch-brazed to a holder.

In general, the present invention contemplates a cutting tool assembly wherein provision is made for eliminating or substantially minimizing the stresses inherent in element having different coefficients of thermal expansion when they are bonded by a brazing operation. The present invention relates particularly to overcoming the difficulties encountered in bonding together dissimilar elements, such as a ceramic cutting tip brazed to a steel tool holder. It has long been recognized that ceramic cutting tools have many desirable characteristics. However, one of the problems which has limited their use is the difficulty of affixing a ceramic cutting tip to a steel holder. One approach to this problem has been to affix the ceramic tip to the tool holder with an epoxy cement. This expedient has not been entirely successful since the violent stresses encountered in use tend to rupture the bond.

Another expedient which has been previously used to bond a ceramic cutting tip to a steel holder is to metalize the ceramic and then braze it directly to the steel tool holder. There are many ceramic metalizing techniques in use today by industry. Most of these techniques yield an impressively strong bond when the ceramic is brazed to its respective metal part. This is evidenced by the fact that when the brazed assembly is tested to destruction, it can be observed that the ceramic itself will rupture before it will part at the interface between the metal and the ceramic. Despite this excellent bond, failures in actual practice due to ruptured ceramic, are unreasonably high and, consequently, detract from the otherwise desirable features of ceramic cutting tools.

While the stresses encountered during the actual machining operation result in the final rupture of the ceramic, it is believed that these stresses by themselves will not rupture the ceramic. They are only contributory. The major stresses leading to the failure are believed to be inherent in the brazed assembly by reason of the thermal mismatch in expansion between the dissimilar materials. By way of explanation, it should be understood that during the brazing operation, which is preferably performed in an atmosphere furnace, the ceramic, because of its low coefficient of thermal expansion, expands only slightly as a result of a positive increment in temperature. The steel commonly used in tool holders expands at a much greater rate. As a consequence, during the brazing operation the dissimilar parts expand at different rates while the temperature is increasing. However, after the brazing filler material has melted and resolidified during the cooling cycle, the dissimilar parts, ceramic and steel, are no longer free to contract at their natural rates. Each being influenced by the other, the result is that at room temperature there are inherent stresses of appreciable magnitude in each of these materials.

In accordance with the present invention it has been found that these inherent stresses may be eliminated or substantially reduced by introducing a metal sandwich or intervening section having a low coefficient of thermal expansion between the ceramic and the steel tool holder, preferably a metal having a coefficient of expansion relatively close to that of an alumina ceramic. The assembly thus combined is then fired in an atmosphere furnace to bond the parts together. It has been found that in practice the intervening section of metal tends to absorb the difference in thermal expansion such as to reduce to a minimum the inherent stresses whereby to provide a strong bond which will stand up under severe stresses in use without breakage of the cutting tip or rupture of the bond. In practice, such an assembly has been tested in actual use in an attempt to destroy the cutting tool under conditions more severe than those conditions which would normally destroy the ceramic tip tools now used in commercial practice, and the present assembly has been found to withstand much more abuse without damage to the tool. In a modified form of the invention a similar assembly is provided with a steel bottom layer which may be torch-brazed to a suitable steel holder by the user.

Referring now to the drawings, 10 represents a cutting tool comprising a ceramic tip assembly indicated generally at 12 bonded to a steel tool holder 14. As illustrated in FIG. 1, the ceramic tip assembly comprises an alumina ceramic cutting element 16, preferably comprising a dense alumina ceramic and a sandwich of metal 18 of substantial thickness, such as molybdenum, having a relatively low coefficient of expansion close to that of the alumina ceramic. A preformed brazing shim 20, such as a copper shim preferably about .001" or .002" thick, is provided between the ceramic element 16 and the sandwich metal 18, and a similar shim 22 is provided between the sandwich metal 18 and the steel holder 14. The steel holder 14 may be cut out or notched as illustrated at 24 to receive the respective parts of the assembly which are held in proper relation to each other by suitable brazing fixtures and fired in a non-oxidizing reducing atmosphere, such as hydrogen or nitrogen.

In preparing the assembly for brazing, the bottom surface of the alumina ceramic cutting element is first metalized, as indicated at 25, in order to make it suitable for the brazing operation. The metalizing material may comprise a mixture of a finely divided refractory metal powder and a suitable flux, or may comprise glassforming compounds which are suspended in a viscous vehicle or binder which is applied as a coating to the ceramic in the area to be bonded. This metalizing coating may be very thin, usually in the order of .0005″ to .003″ thick. After coating, the ceramic is fired at temperatures on the order of 1300° C. to 1650° C. in a reducing atmosphere. The fired coating is then electroplated with nickel or like material in order to enhance its wettability by the usual brazing materials. The ceramic cutting tip thus prepared prior to assembly is then assembled with the preformed brazing shims 20, 22 and the molybdenum sandwich 18 in the manner described and placed in the notch 24 of the tool holder 14 whereupon the assembly is fired in a reducing atmosphere to braze the parts together.

The cutting tip assembly 30 illustrated in FIG. 3 may comprise a similar assembly with the addition of a steel base member 32 which is adapted to be torch-brazed by the user to a suitable steel tool holder. Thus, the cutting tip assembly 30 comprises an alumina ceramic cutting element 34 prepared with a metalizing compound and a nickel coating as described, a sandwich metal member 36, preformed copper brazing shims 38, 40 and the steel base member 32. The parts thus assembled may be fired in a reducing furnace as described.

From the description thus far it will be seen that the provision of an intervening metal section 18 between the ceramic cutting element 16 and the steel tool holder 14 provides a stress-absorbing layer capable of eliminating or reducing to a minimum any inherent stresses caused by expansion of the different elements during firing and retraction during cooling to provide a substantially stronger bonded assembly substantially free of such stresses. As a result, the present cutting tip assembly is capable of withstanding substantially greater cutting stresses under use in machining operations. While I have illustrated a metal cutting lathe tool embodying the present invention, it will be apparent that the same principle may be embodied in other types of machining tools, such as cutting elements used in planing, milling, boring or shaping metal.

It will be understood that the materials of the cutting tool specified herein are for illustrative purposes only and that the present invention contemplates the use of other materials which have different coefficients of thermal expansion wherein stresses might be generated in the parts after brazing and during cooling. In practice, the intervening molybdenum section 18 should be of substantial thickness on the order of about one-sixteeth of an inch, more or less, in order to have sufficient body to absorb the stresses resulting from the brazing and cooling operation. Molybdenum is a preferred material because of its low coefficient of thermal expansion. However, other suitable materials having a low coefficient of expansion could be used.

The alumina ceramic cutting element 16 is preferably of maximum density, but other ceramics of less density may be used. The metalizing and plating procedure described may also be varied by known techniques to produce the desired results. The preformed brazing shims, herein specified as copper, may comprise other suitable materials to produce equally good bonding results.

As an example of the capability of the present cutting tool to withstand exceedingly high stresses in actual use, the tool was tested in a lathe for cutting a shaft of stainless steel in an attempt to destroy the ceramic cutting tip or fracture the bond. The tool was adjusted to remove a chip .020″ thick from the rotating shaft which was rotated at a speed of 1700 r.p.m., with the tool adjusted to move along the shaft at a rate of .0005″ per revolution. Under these severe conditions, a red hot chip was removed from the length of the shaft to produce a mirror finish surface on the reduced diameter shaft without damage to the tool.

While the above example demonstrates one test of the potential strength of the present tool, it is not intended as a limitation of the potential capability of the tool to withstand cutting stresses of greater magnitude.

While the preferred embodiment of the invention has been herein illustrated and described, it will be understood that the invention may be embodied in other forms within the scope of the following claims.

Having thus described the invention, what is claimed is:

1. A cutting element comprising a brazed assembly adapted to be secured to a holder comprising a ceramic cutting tip metalized on its bottom surface and electroplated with a wettable metal, a layer of molybdenum, a preformed brazing shim between the ceramic cutting tip and the molybdenum, and a similar shim on the bottom surface of the molybdenum.

2. A cutting element comprising a brazed assembly adapted to be secured to a holder comprising a ceramic cutting tip metalized on its bottom surface and electroplated with a wettable metal, a layer of molybdenum, a preformed brazing shim between the ceramic cutting tip and the molybdenum, a steel base member, and a similar shim between the molybdenum and the base member.

3. A cutting tool comprising a brazed assembly including a ceramic cutting tip metalized on its bottom surface and electroplated with a wettable metal, a layer of molybdenum, a preformed brazing shim between the ceramic cutting tip and the molybdenum, a steel tool holder, and a similar shim between the molybdenum and the steel holder.

4. A cutting tool comprising a brazed assembly adapted to be brazed to a steel tool holder, said brazed assembly comprising a ceramic cutting tip metalized on its bottom surface and electroplated with a wettable metal, a layer of molybdenum, a preformed brazing shim between the ceramic cutting tip and the molybdenum, a steel base member, and a similar shim between the molybdenum and the base member.

References Cited

UNITED STATES PATENTS

| | | | |
|---|---|---|---|
| 2,019,934 | 11/1935 | Schroter | 29—95 |
| 2,570,248 | 10/1951 | Kelley | 29—472.7 |
| 3,256,598 | 6/1966 | Kramer | 29—484 |

HARRISON L. HINSON, Primary Examiner